United States Patent [19]

Molina

[11] Patent Number: 4,464,091

[45] Date of Patent: Aug. 7, 1984

[54] CAPTIVE FASTENER

[75] Inventor: Jorge W. Molina, Torrance, Calif.

[73] Assignee: Deutsch Fastener Corp., El Segundo, Calif.

[21] Appl. No.: 431,714

[22] Filed: Sep. 30, 1982

Related U.S. Application Data

[62] Division of Ser. No. 224,057, Jan. 12, 1981, abandoned.

[51] Int. Cl.³ ............................................. F16B 37/04
[52] U.S. Cl. ................................... 411/105; 411/108; 411/119
[58] Field of Search ............... 411/103, 105, 106, 107, 411/108, 111, 113, 117, 119, 120, 121, 123, 124, 126, 131, 427

[56] References Cited

U.S. PATENT DOCUMENTS

| | | | |
|---|---|---|---|
| 2,393,436 | 1/1946 | Wallace | 411/106 |
| 2,405,925 | 8/1946 | Poupitch | 411/113 |
| 2,829,696 | 4/1958 | Wagner | 411/105 X |
| 2,935,785 | 2/1976 | Lathom | 411/413 |
| 2,949,143 | 8/1960 | Shur | 24/221 R |
| 3,079,970 | 3/1963 | Barry | 411/113 |
| 3,093,179 | 6/1963 | Zahodiakin | 411/353 |
| 3,126,935 | 3/1964 | Tuozzo | 411/352 |
| 3,177,916 | 4/1965 | Rosan | 411/103 |
| 3,192,980 | 7/1965 | Sauter | 411/105 |
| 3,368,602 | 2/1968 | Boyd | 411/105 |
| 3,896,867 | 7/1975 | Gill et al. | 411/353 |
| 4,227,561 | 10/1980 | Molina | 411/103 |
| 4,236,562 | 12/1980 | Molina | 411/103 |

FOREIGN PATENT DOCUMENTS

| | | | |
|---|---|---|---|
| 157520 | 7/1954 | Australia | 411/337 |
| 2162609 | 6/1973 | Fed. Rep. of Germany | 411/119 |
| 1406217 | 6/1965 | France | 411/337 |
| 55-5121 | 1/1980 | Japan | 411/337 |
| 495976 | 11/1938 | United Kingdom | 411/113 |
| 1085387 | 9/1967 | United Kingdom | 411/121 |
| 1135659 | 12/1968 | United Kingdom | 411/106 |

Primary Examiner—Thomas J. Holko
Attorney, Agent, or Firm—Gausewitz, Carr, Rothenberg & Edwards

[57] ABSTRACT

This invention provides a captive screw and a nut, the captive screw including a collar having an opening receiving the shank of a screw, the opening having a portion of wide diameter and a portion of narrow diameter. The screw has a full-depth thread at its outer end, and a truncated thread inwardly thereof, the truncated thread being dimensioned to pass through the narrow part of the opening in the collar while the full-depth thread cannot so that the screw is retained by the collar yet the end of the screw can be entirely retracted within the collar. The nut assembly includes a sleeve with an external shoulder, a straight knurl, and a flarable end, internally having a hexagonal portion in its bore. The nut has a hexagonal portion which extends into the sleeve and is smaller in lateral dimension than that of the opening to permit lateral floating movement, and longer axially than the hexagonal portion of the bore, to permit relative axial movement of the nut relative to the sleeve. The nut and sleeve have interengageable abutments to limit the axial movement of the nut relative to the sleeve.

9 Claims, 4 Drawing Figures

CAPTIVE FASTENER

This is a division of applicaion Ser. No. 224,057, filed Jan. 12, 1981, now abandoned.

BACKGROUND OF THE INVENTION

Removable panels frequently are secured to a supporting structure by means of captive fasteners, typically including screws carried by the panel to engage nuts on the supporting structure. In the manufacture of some of these captive screws, the shank of the screw blank is extended through a collar, after which threads are rolled on the outer end of the shank, producing threads having a major diameter greater than the diameter of the opening in the collar. Therefore, the screw cannot escape from the collar. However, because of the diameter of the threads, the shank of the screw cannot be retracted into the collar when the fastener is in the separated condition. This means that the threaded screw shank end will project beyond the collar where it is subject to damage because it is not protected. For example, deck plates on ships periodically must be removed to provide access to the space below. These deck plates commonly are thrown down on the adjacent deck area upon their removal. Conventional protruding captive screws are unsuitable for such uses because they will become damaged and unusable when the plates are dropped and the impact is taken by the unprotected screw shank ends.

It is possible to increase the length of the collar and provide a counterbore of larger diameter to permit the threaded screw shank to retract fully into the counterbore area. This requires a significant increase in the length of the collar, however, which causes the collar to project a substantial distance beyond the surface of the panel to which it is secured. Again, taking the example of deck plates, this is unacceptable because the high projections of such elongated collars off the level of the deck.

Another problem with conventional fasteners arises from the fact that the nut is substantially fixed in position axially by an element of the assembly which retains it. This may be merely a flared end on the nut which forms a flange that engages the supporting structure to hold the nut in place against a force tending to push it away from the supporting structure. This is not a strong attachment, but that is not important if the fastener is used properly because significant push-out forces are not imposed on the nut. When the screw is tightened all the way into the nut, the head of the screw engages the seat on the collar, and the nut is drawn against the supporting structure rather than being pushed away from it.

However, if the screw is not fully tightened, the nut will hold the screw so that the screwhead is displaced from its seat. Therefore, if an axial load is imposed on the screw partially secured in this manner, such as by stepping or dropping something on it, the force will be transmitted directly to the nut. This may be much too great a load for the nut retention flange to absorb and, as a result, the nut will be popped loose from the supporting structure. This destroys the functionality of the fastener.

BRIEF DESCRIPTION OF THE INVENTION

The present invention overcomes the difficulties outlined above, providing a fully retractable fastener that is not vulnerable to damage.

The fastener includes a captive screw assembly which has a relatively short collar, with a head at one end and a thin-walled opposite end, adapted to be bent outwardly to form a retaining flange. Internally, the collar has another end of wide diameter inwardly of which the diameter is reduced. The screw is extended through the collar and threads formed thereafter. The outermost one or two turns of the thread are made full size, which is of greater major diameter than the minimum opening through the collar, although of lesser diameter than the wide part of the opening. However, inwardly of the end the thread is truncated, that is, having a smaller major diameter such that it can slide through the smaller part of the opening in the collar. Hence, the fastener can be retracted until the full size part of the thread reaches the minimum diameter portion of the collar. With the larger part of the thread being limited to the very end of the shank, this allows the entire shank end to be retracted into the collar. Hence, the shank is not vulnerable to damage. Nevertheless, the collar has only a flange at the opposite end and hence a minimal projection above the panel with which it is associated.

The nut assembly includes a sleeve that is adapted to fit within an opening in a workpiece, with a straight knurl on the periphery of the sleeve becoming embedded in the wall of the opening to prevent rotation. A thin outer end wall of the sleeve, opposed to a radial flange at the base of the knurl, is adapted to be flared outwardly to retain the sleeve to the workpiece. Internally, the sleeve includes a cylindrical portion extending inwardly from the thin-walled outer end, and a hexagonal portion at the opposite end, with a shoulder between them.

The nut includes a hexagonal exterior portion which is of smaller lateral dimension and greater axial dimension than the hexagonal opening in the sleeve which receives it. Consequently, the nut is free for limited axial movement and also can float to some extent laterally relative to the sleeve. The two noncircular surfaces, that is, the hexagonal wall of the opening and the hexagonal exterior of the nut, preclude substantial rotation of the nut. A flange at either end of the hexagonal part of the nut limits its axial travel.

As a result of this construction, the screw can be tightened in the usual manner, to bring one flange of the nut into engagement with the end of the sleeve to secure the fastener. However, should the nut be only partially tightened, it can drop downwardly axially to enable the undersurface of the head of the screw to engage the upper surface of the collar. Therefore, if an axial load is imposed on the head of the screw under those conditions, it is taken out through the collar and does not cause movement of the screw. Therefore, there is no axial force then imposed on the nut and damage to the nut assembly is avoided.

DETAILED DESCRIPTION OF THE PREFERRED EMBODIMENT

Figure 1:
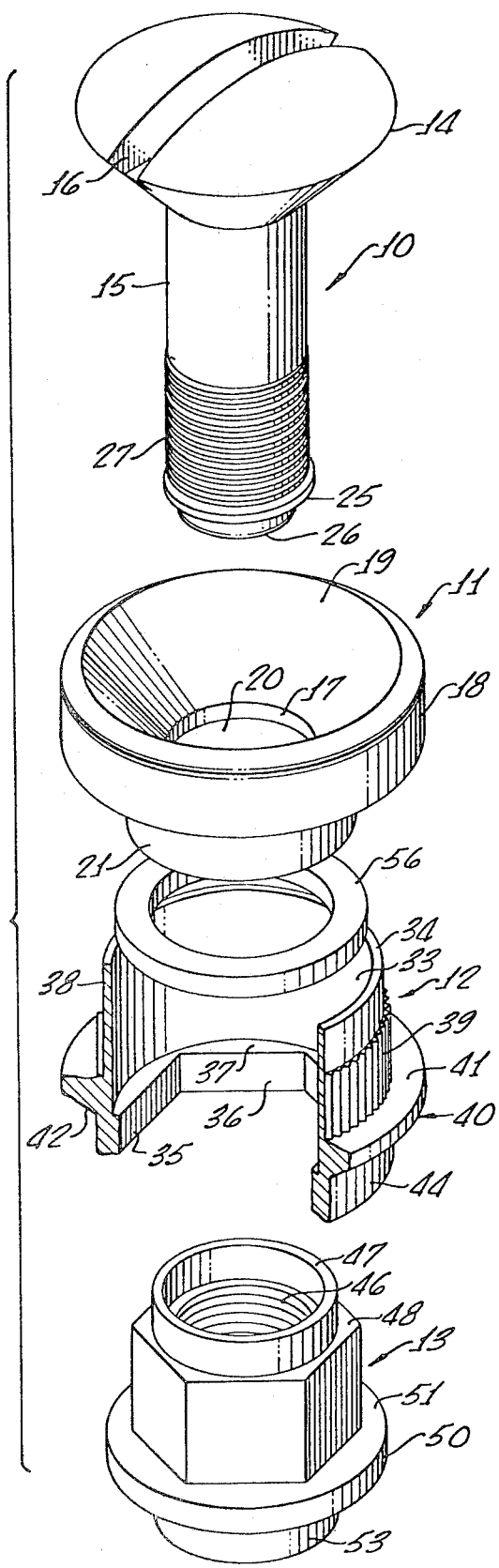
FIG. 1 is an exploded perspective view of the components of the fastener of this invention.

The fastener assembly shown in FIGS. 1-4 includes a bolt 10, collar 11, sleeve 12 and nut 13.

The bolt 10 includes a head 14 from which extends a shank 15, with a suitable driving recess 16 being formed in the head. The shank 15 of the bolt is longer than the collar 11 and fits through the bore 17 of the collar.

One end portion 18 of the collar has a relatively large outside diameter and a countersink 19 that extends inwardly to the bore 17. A counterbore 20 is formed in the opposite end portion 21, meeting the bore 17 at a radial shoulder 22. The outside diameter of the end portion 21 is reduced so that there is an exterior radial undersurface 23 for the end portion 18, which acts as a head for the collar. The wall of the end portion 21 at the counterbore 20 is relatively thin and bendable.

In the manufacture of the fastener, the shank 16 of the bolt 14 is extended through the bore 17 of the collar 11, with head 14 of the bolt beyond the collar end portion 18 and the outer end of the shank projecting beyond the end portion 21 of the collar. After this, a rolled screw thread is formed on the outer end of the shank. Only one or two turns 25 adjacent to the outer end 26 of the shank are made to full thread height. The remainder 27 of the thread is truncated with the crest of reduced height, flattened at the tip. The major diameter of the thread 27 is less than that of the bore 17 of the collar 11 so that the portion of the shank 15 at the thread 27 may be moved freely through the bore. The outer end thread portion 25, however, of full depth, although of lesser diameter than the counterbore 20, is larger in diameter than the bore 17. This means that the bolt 10 is captured by the collar 11 because the shank 16 cannot be moved out of the bore 17. In one direction of movement, downward as illustrated, the head 14 is too large to enter the bore 17 and so limits the travel of the bolt. Upward movement of the bolt 10 is blocked when the thread 25 engages the radial shoulder 22 between the central bore 17 and the counterbore 20.

Figure 2:
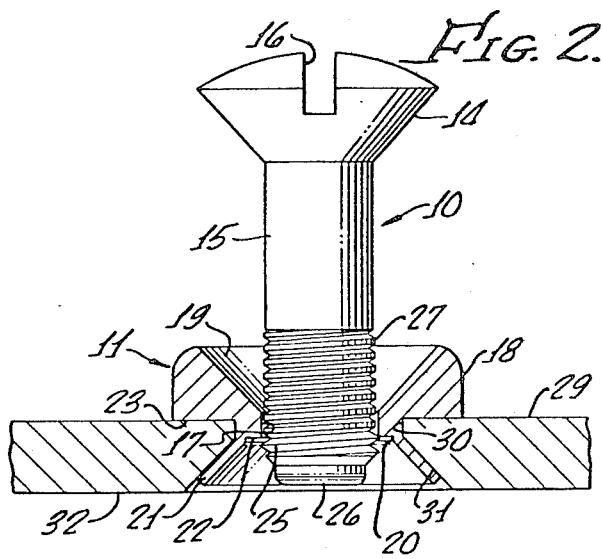
FIG. 2 is a sectional view, partially in elevation, of the captive screw portion of the fastener.

In use of the fastener, the collar is secured to a workpiece, such as a panel or plate 29, as shown in FIG. 2. An opening 30 extends through the plate 29 and is provided with a countersink 31 at one end. The end portion 21 of the collar is received in the bore 30 and its wall is flared outwardly against the surface of the countersink 31. Therefore, the undersurface 23 of the end portion 18 of the collar 11 cooperates with the outwardly flared wall of the end portion 21 to secure the collar to the plate 29. As installed, the end portion 21 of the collar is entirely received within the opening in the plate 29.

Because the only full depth thread segment 25 is adjacent to the end 26 of the shank 16 of the bolt 10, the shank can be withdrawn completely into the collar and hence into the opening in the plate 29, as seen in FIG. 2. With the thread portion 25 being close to the end 26 of the shank, the end 26 does not extend below the lower surface 32 of the plate 29 when the thread 25 is in engagement with the shoulder 22. This is true even when the collar end is flared outwardly at 45 degrees, as illustrated. This is unlike conventional captive fasteners in which all of the threads are enlarged so that either they cannot be withdrawn fully into the collar or the collar must be made of an extreme length so as to project well beyond the upper surface of the workpiece receiving it. When the plate 29 is loosened and removed from its normal installed position, the fastener will not become damaged even if the plate is dropped on an adjacent surface because the shank 15 merely will be pushed upwardly in the opening in the plate 29 and will not absorb the forces imposed upon the plate.

The full retraction of the shank 16 is accomplished even though the collar 11 is quite short axially. Only the head 18 of the collar protrudes above the upper surface of the plate 29, and it is of minimum thickness to provide a seat for the head 14 of the bolt. In the example shown, the collar is so short that when the shank 16 is retracted, as in FIG. 2, there is more of the length of the shank protruding above the collar than there is inside the collar.

The sleeve 12 includes a cylindrical bore 33 extending through most of its length from one end 34, which is the upper end as the device is illustrated. Inwardly of the lower end 35 of the sleeve 12, the opening 36 is hexagonal, connecting to the cylindrical bore through a radial shoulder 37.

On its exterior, the upper portion 38, that is, the portion extending inwardly from the end 34, has a smooth cylindrical exterior surface and a relatively thin circumferential wall. A straight knurl 39 is on the exterior surface axially inwardly of the upper end portion 38. At the base of the knurl 39 is a flange 40 having a radial surface 41 adjacent the knurl, and a tapered surface 42 extending toward the lower end 35 of the sleeve. The section 44 of the sleeve, between the flange 40 and the end 35, has a cylindrical outer surface and a thicker wall than that of the opposite end portion 38.

The nut 13 has a threaded bore 46 adapted to mesh with the thread 25 and 27 of the bolt 10. A short thin-walled flange 47 extends axially from the upper end surface 48 of the nut 13, as illustrated. The upper portion of the nut has a hexagonal exterior which is of slightly smaller lateral dimension than the hexagonal portion 36 of the bore of the sleeve 12. A flange 50 extends around the nut at the base of the hexagonal portion 49, presenting a radial surface 51 adjacent the hexagonal section of the nut. The opposite end 52 of the flange 50 is tapered to converge downwardly. A short cylindrical surface 53 extends from the flange 50 to the lower end 54 of the nut.

In the assembly, the hexagonal portion 49 of the nut 13 is positioned within the hexagonal section 36 of the bore in the sleeve 12 with its upper end extending into the cylindrical bore 33. A washer 56 is fitted over the upper end wall 48 of the nut around the flange 47. The latter element then is bent outwardly to overlap the washer 56, holding the washer to the nut. The washer 56 extends over the radial shoulder 37 of the sleeve which captures the nut within the sleeve. Axial movement in one direction is limited by the washer 56 and in the opposite direction by the radial surface 51 of the flange 50. The hexagonal section 49 is longer than the hexagonal portion 36 of the opening in the sleeve 12, so that the nut 13 can move a limited axial distance relative to the sleeve 12.

The assembly of the sleeve 12 and nut 13 is secured to a workpiece 57 by pressing the end portion 38 and the knurl 39 into a complementary cylindrical opening 58 in the workpiece. As this is done the teeth of the knurl 39 become embedded in the wall of the opening 58 so as to resist rotation of the sleeve 12. The upper radial surface 41 of the flange 40 of the sleeve is brought to bear against the outer surface 59 of the workpiece 57. The wall of the end portion 38 then is flared outwardly to overlie a countersink 60 at the upper end of the opening in the workpiece 58. The flange 40 and the flared end 38 then cooperate to hold the assembly to the workpiece 57.

Figure 3:
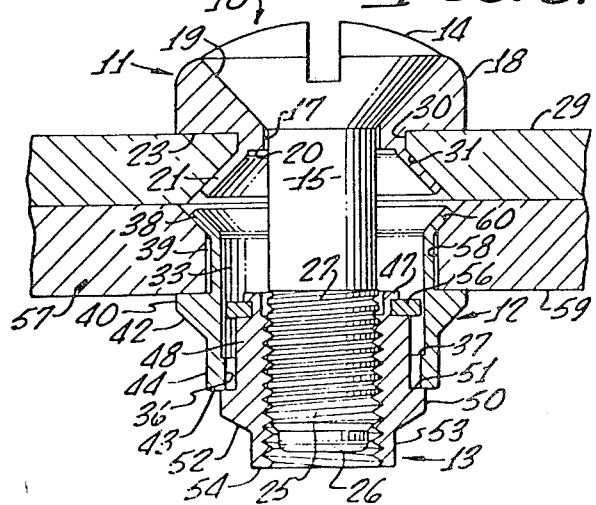
FIG. 3 is a sectional view of the screw and nut assemblies in a partially secured condition.

When the plate 29 is to be secured to the workpiece 57, the bolt 10 is tightened into the nut 13, as illustrated in FIG. 3. The nut 13 is prevented from rotating as this occurs by the engagement of the hexagonal nut portion 49 with the wall of the hexagonal portion 36 in the bore of the sleeve 12. The latter element is rotationally fixed relative to the workpiece 57 by the embedment of the knurl 39 of the sleeve in the wall of the opening 58. Tightening of the bolt 10 in the nut 13 draws the nut upwardly so that the radial surface 51 of the flange 50 of the nut acts as an abutment that bears against the abutment formed by the end 35 of the sleeve. The retention force is transmitted through the sleeve to the radial flange 40, which in turn, through the surface 41, transmits the retention force to the workpiece 57.

Figure 4:
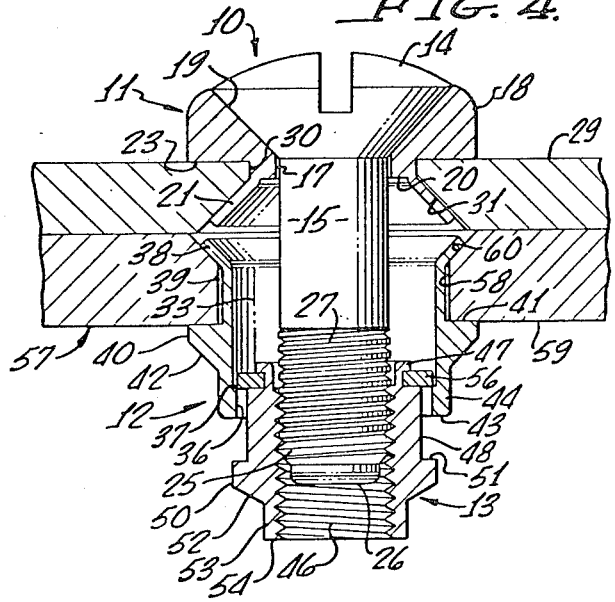
FIG. 4 is a view similar to FIG. 3 but with the fastener fully secured.

In the event the bolt is only partially threaded into the nut, the head 14 of the bolt nevertheless may be in engagement with the surface of the countersink 18 in the collar 11, as illustrated in FIG. 4. This is because the nut 13 is free to slide downwardly, axially, relative to the sleeve 12, with this axial movement being limited only by the washer 56. The radial shoulder 37 and washer 56 act as abutments in terminating the downward movement of the nut.

Therefore, if the bolt is improperly tightened, so as to be only partially threaded into the nut, the head 14 of the bolt nevertheless may engage its seat at the countersink 19 because of the downward shifting of the nut. Consequently, an axial force on the head end of the bolt will not damage the fastener. With the head 14 of the bolt resting against the collar 11, such an axial force will not produce any axial movement of the bolt. In conventional designs where the nut is held axially, however, an axial force of this type could dislodge the nut from the workpiece and the fastener then no longer would be usable.

In addition to the axial movement permitted the nut, it may float transversely, as well, because the hexagonal portion 49 of the nut is of smaller lateral dimension than that of the opening 36 in the sleeve. This facilitates the engagement of the bolt with the nut.

The foregoing detailed description is to be clearly understood as given by way of illustration and example only, the spirit and scope of this invention being limited solely by the appended claims.

I claim:

1. In combination with a screw device having a screw with a threaded shank and a retainer for said screw, a nut assembly comprising
 a sleeve,
 said sleeve including means for attachment to a workpiece,
 and an internally threaded member,
 said sleeve having an opening therethrough having a noncircular portion of a first length adjacent one end of said sleeve, and an interior portion inwardly of said noncircular portion,
 said member having a noncircular exterior surface portion received in said noncircular portion of said opening, whereby said member is prevented from substantial rotation relative to said sleeve,
 said noncircular portion of said member being of a second length which is greater than said first length, whereby said member has freedom for limited axial movement relative to said sleeve and portions of said member can extend into said interior portion of said opening,
 said member having a first abutment exteriorly of said sleeve and a second abutment in said interior portion of said opening,
 said sleeve having a first abutment engageable by said first abutment of said member when said threaded shank is tightened into said member,
 said sleeve having a second abutment interiorly thereof engageable by said second abutment of said member when said threaded shank is loosened with respect to said member.

2. A device as recited in claim 1 in which
 said noncircular portion of said opening and said noncircular portion of said member are hexagonal,
 said noncircular portion of said member being of smaller lateral dimension than said noncircular portion of said opening, whereby said member has freedom for limited lateral floating movement relative to said sleeve.

3. A device as recited in claim 1 in which for said means for attachment to a workpiece
 said sleeve has an external shoulder adapted to engage a surface of a workpiece, and a cylindrical portion extending outwardly from said shoulder,
 said cylindrical portion including an outwardly bendable end portion for being flared outwardly to form a flange for cooperating with said shoulder in retaining said sleeve to such a workpiece.

4. A device as recited in claim 3 in which said cylindrical portion of said sleeve includes tooth means thereon for embedment in the wall of an opening in a workpiece receiving said cylindrical portion for thereby preventing rotation of said sleeve relative to such a workpiece.

5. A device as recited in claim 4 in which said tooth means is a straight knurl.

6. A device as recited in claim 10 in which said second abutment of said member is defined by a flange extending radially outwardly at one end of said member.

7. A device as recited in claim 6 in which said flange is defined by a washer engaging said one end of said member and projecting radially therefrom, said member having a relatively thin flange bent over the inside portion of said washer for retaining said washer to said member.

8. A fastener comprising
 a collar having
 an exterior surface for engagement with a first workpiece,
 a relatively thin outwardly bendable wall at one end for being bent outwardly for cooperating with said surface to hold said collar to such a workpiece, said collar having an opening therethrough having a first portion of a first lateral dimension adjacent said one end thereof, a second portion of a second and smaller lateral dimension inwardly of said first portion, and an abutment between said first and second portions of said opening,
 a screw having
 a head at one end,
 and a shank extending therefrom, said shank being received in said opening in said collar, said shank having a thread extending inwardly from the outer end thereof, said thread having a first relatively short portion at said outer end and a second longer portion inwardly of said outer end, said first portion of said thread having a major diameter smaller than the lateral dimension of said first portion of said opening and larger than the lateral dimension of said second portion of said opening, said second portion of said thread having a major diameter smaller than said lateral dimension of said second portion of said opening, whereby said second portion of said thread can pass through said second portion of said opening but said first portion of said thread cannot enter said second portion of said opening, said first portion of said thread having an axial extent such that when said first portion of said thread is in juxtaposition with said abutment of said collar said outer end of said shank is entirely received within said collar, a sleeve having a relatively thin outwardly bendable wall at one end for being bent outwardly for engagement with a second workpiece, an exterior flange inwardly of said one end for cooperating with said wall of said nut member to hold said nut member to such a second workpiece, a first abutment at the opposite end thereof, an opening therethrough having a first portion adjacent said one end, and a second portion adjacent said opposite end of said sleeve said second portion being noncircular, said second abutment being between said first and second portions of said opening in said sleeve, and a nut member having an internal thread adapted to receive and mesh with said thread of said shank, a noncircular exterior portion received in and having a greater axial dimension than said second portion of said opening in said sleeve, whereby said nut member can move axially relative to said sleeve, a first abutment in said sleeve and engageable with said second abutment of said sleeve for limiting the axial movement of said nut member relative to said sleeve in one direction, a second abutment exteriorly of said sleeve for engagement with said first abutment of said sleeve for limiting the axial movement of said nut member relative to said sleeve in the opposite direction, whereby said second abutment of said nut member is engageable with said first abutment of said sleeve when said shank is tightened into said nut member, and said first abutment of said nut member is engageable with said second abutment of said sleeve when said shank is loosened relative to said nut member.

9. In combination with a screw device having a screw with a threaded shank and a retainer for said screw, a nut assembly comprising a sleeve, said sleeve including means for attachment to a workpiece, and an internally threaded member, said sleeve having an opening therethrough having a noncircular portion of a first length adjacent one end of said sleeve, and an interior portion inwardly of said noncircular portion, said member having a noncircular exterior surface portion received in said noncircular portion of said opening, whereby said member is prevented from substantial rotation relative to said sleeve, said noncircular portion of said member being a second length which is greater than said first length, whereby said member has freedom for limited axial movement relative to said sleeve and portions of said member can extend into said interior portion of said opening, said member having a first abutment exteriorly of said sleeve and a second abutment in said interior portion of said opening, said sleeve having a first abutment engageable by said first abutment of said member when said threaded shank is tightened into said member, said sleeve having a second abutment interiorly thereof engageable by said second abutment of said member when said threaded shank is loosened with respect to said member, said noncircular portion of said opening and said noncircular portion of said member being hexagonal, said noncircular portion of said member being of smaller lateral dimension than said noncircular portion of said opening, whereby said member has freedom for limited lateral floating movement relative to said sleeve, said interior portion of said sleeve being cylindrical and of greater lateral dimension than said noncircular portion of said opening, said sleeve having a surface interconnecting said noncircular portion thereof and said interior portion which forms said second abutment of said sleeve.

* * * * *

UNITED STATES PATENT AND TRADEMARK OFFICE
CERTIFICATE OF CORRECTION

PATENT NO. : 4,464,091
DATED : Aug. 7, 1984
INVENTOR(S) : JORGE W. MOLINA

It is certified that error appears in the above-identified patent and that said Letters Patent are hereby corrected as shown below:

Claim 6, line 43, column 6, "10" should be ---1---.

Signed and Sealed this

Fifth Day of March 1985

[SEAL]

Attest:

DONALD J. QUIGG

*Attesting Officer*     *Acting Commissioner of Patents and Trademarks*